(No Model.)
J. MARSHALL.
MOLD FOR FORMING HATS.
No. 517,470. Patented Apr. 3, 1894.
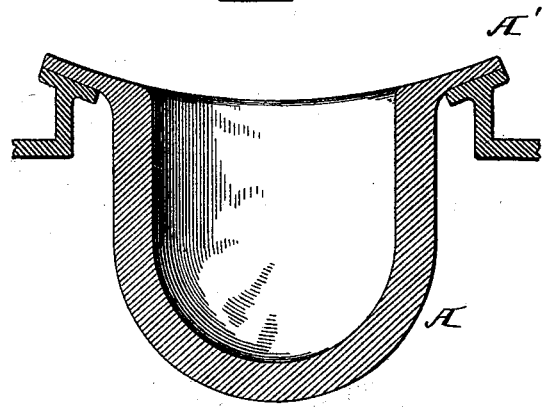
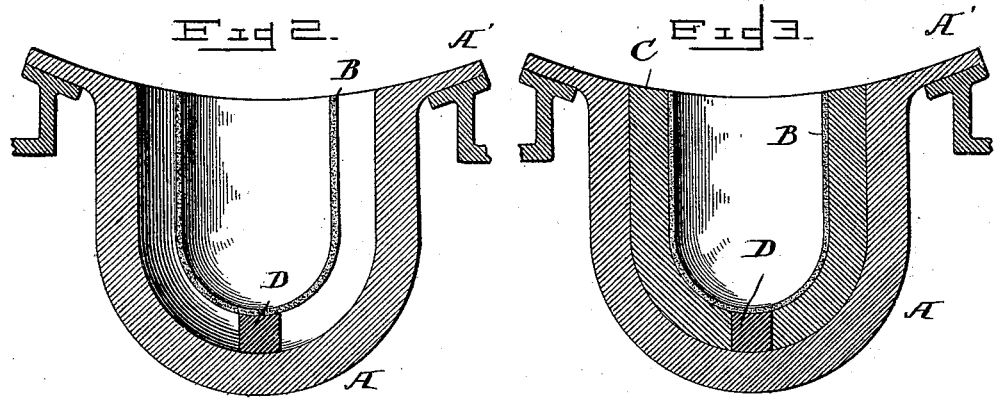
WITNESSES
INVENTOR:
James Marshall,
by Foster, Freeman & Co.
his Attorneys.

UNITED STATES PATENT OFFICE.

JAMES MARSHALL, OF FALL RIVER, MASSACHUSETTS.

MOLD FOR FORMING HATS.

SPECIFICATION forming part of Letters Patent No. 517,470, dated April 3, 1894.

Application filed August 18, 1893. Serial No. 483,458. (No model.)

*To all whom it may concern:*

Be it known that I, JAMES MARSHALL, a citizen of the United States, residing at Fall River, in the county of Bristol and State of Massachusetts, have invented certain new and useful Improvements in Molds for Forming Hats; and I do hereby declare that the following is a full, clear, and exact description of the invention, which will enable others skilled in the art to which it appertains to use the same.

My invention relates to molds for forming hats under hydraulic pressure, and it has for its objects to overcome the disadvantages due to the use of the molds as ordinarily used for this purpose, and to provide a mold which shall be cheap, simple and effective and which shall be capable of being changed so as to form hats of different shapes and configurations with comparatively little expense and labor, and to these ends my invention consists in the molds having the features of construction, substantially as herein set forth.

In the accompanying drawings, forming a part of this specification, and in which like letters of reference indicate corresponding parts, Figure 1 is a vertical section of the external shell. Fig. 2 is a vertical section showing the external shell and the inner shell or mold in place. Fig. 3 is a similar view showing the mold complete.

Heretofore it has been customary to provide molds for forming hats under hydraulic pressure or other pressure, by hollowing out a block of iron to approximately the desired shape and then finishing by grinding them out with emery wheels or otherwise, and as these molds have to be strong to withstand the presure to which they are subjected, it is necessary that they should be carefully made and be perfect in construction, and it often happens that when a mold is nearly completed a flaw in the iron is found, or the shape is ruined by grinding out the molds too much, thus making the molds utterly worthless, in consequence of which it has to be thrown away and the great cost and tedious labor involved in their making lost. It has also been found that these molds are often ruined by the shrinkage of the iron, thus changing the interior shape of the mold and rendering it practically impossible to maintain the making of hats of a uniform shape and size. More than that, the molds when once made cannot be readily changed or varied in their configuration in order to meet change of style, and it thus requires a large expenditure of money and time to provide the molds for an extensive business. Molds have also been made heretofore with an external shell, an inner shell or mold and an intervening filling of yielding material or fluid, such as sand, water under pressure, &c., but as the inner mold or shell when supported by yielding material, and subjected to great pressure is liable to be moved out of alignment with the plunger of the hydraulic press, and consequently be crushed at the next descent of the plunger, this construction is impracticable.

It is one of the main objects of my invention to avoid these difficulties and at the same time to provide a mold which may be readily altered to adapt it to the molding of the different configurations, thereby not only saving great expense but considerable time and labor in varying the molds, and I will now describe my invention in connection with the accompanying drawings. The external shell A is made of some substantial material having a configuration adapted for the purposes intended, and while it may be variously made, I have found it convenient to make it of cast iron, preferably having a uniform thickness and provided with a suitable flange or projection A', whereby it may be readily supported in the press or other position to be operated upon. The inner shell or mold proper B is made to have any configuration desired, and while this shell or mold may be variously formed, I prefer to make it by the well known process of electro-deposition. Thus a wooden block or plaster cast is made of the shape desired and submitted to the electrolytic process, when it is covered with a coating of sufficient thickness, usually about one-sixteenth of an inch, more or less, and this shell being removed forms the inner shell or mold, and it will be readily seen that it can be quickly and accurately formed of any shape or style to suit, and while I prefer to make it of the electrolytic depositing, it will be evident that it may be otherwise formed by spinning the metal over the plaster cast or wooden block, or in any other desirable way. I preferably make this inner shell or mold of copper, as it is cheap and not liable to rust, although of course nickel or other metals may be used. This inner mold is arranged within the outer case and the intervening space supplied with a filling metal C, preferably fusible at a low temperature, such for instance as white metal, Babbitt metal, or the like, and in order to support the inner mold or shell in position in the outer shell, while the fusible metal is being applied, I find it convenient to provide a block D on which it may rest and which may be of any material, preferably not liable to fusion by the melting metal. The mold thus formed can be used in the usual way and it is understood that the hats are placed over or in the inner shell and a plunger or die of proper configuration is brought down upon them under hydraulic or other pressure, and the hat forced into the mold and made to conform to the proper or desired shape.

When it is desired to change the shape of the inner shell or mold to correspond with the changing style, it is only necessary to heat the outer shell sufficient to melt the fusible metal, when the inner shell or mold can be removed and a new one readily substituted, and it will thus be seen that in this way I save, not only a large expense in having a large number of heavy outer shells, but that the shells may be made of cheap metal, the essential feature being that they shall be strong and substantial, but need not be carefully and smoothly finished, as the filling material between the inner shell or mold will compensate for and accommodate itself to any inequalities in the inner surface of the outer shell.

While I have illustrated and described one preferred embodiment of my invention, and the manner of accomplishing it, it will be understood that the details can be varied by those skilled in the art, without departing from the spirit of my invention, and I do not, therefore, limit myself to the precise construction and arrangement shown and described.

What I claim is—

A mold for forming hats under pressure, comprising an outer shell, an inner shell or mold, and an intervening filling of fusible metal, substantially as described.

In testimony whereof I have signed my name to this specification in the presence of two subscribing witnesses.

JAMES MARSHALL.

Witnesses:
DAVID F. SLADE,
BERTHA L. HATHAWAY.